Aug. 16, 1927.
P. W. KOCH
1,639,569
MANHOLE SWITCH
Filed April 14, 1924
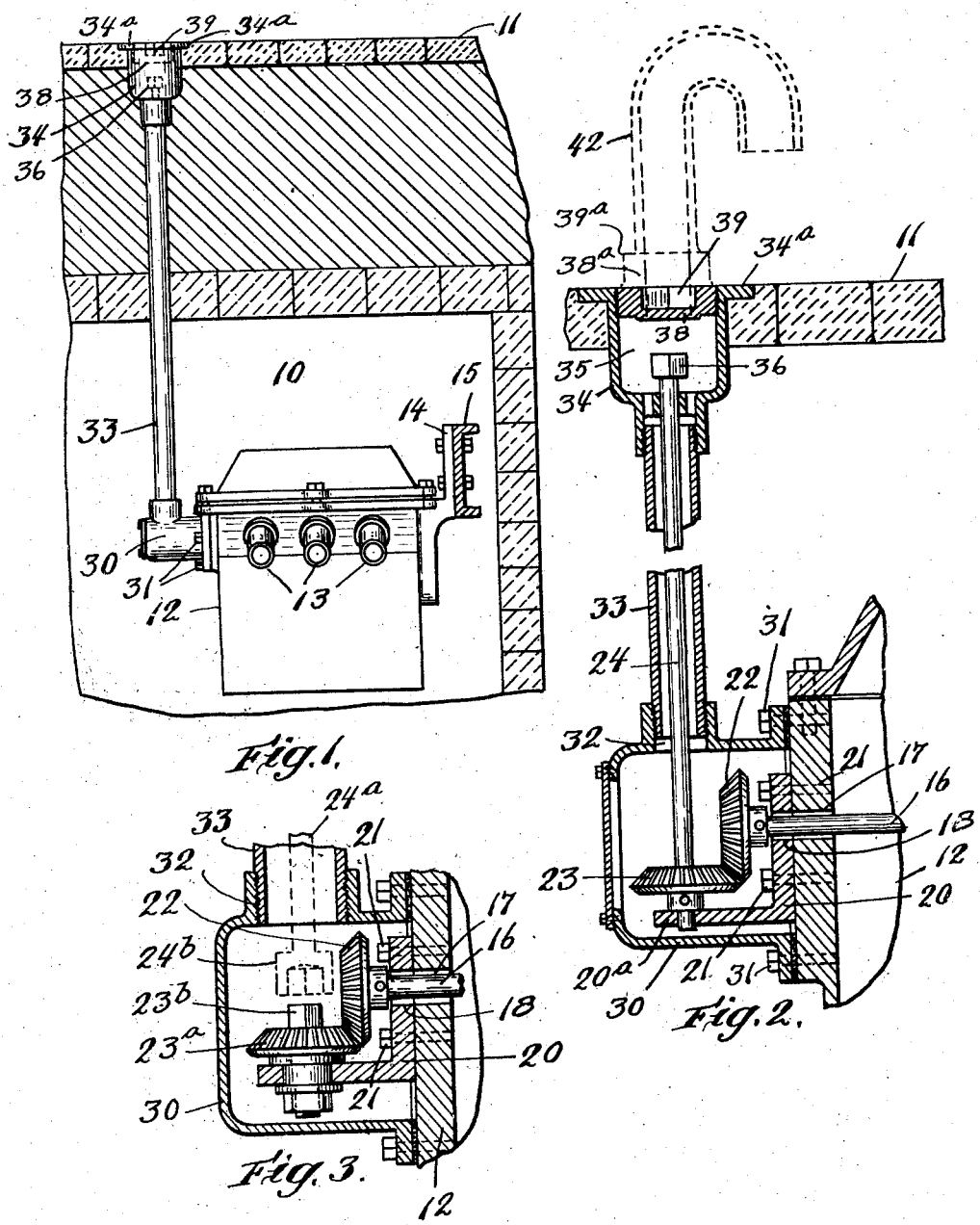
Inventor,
Paul W. Koch Patented Aug. 16, 1927.

1,639,569

UNITED STATES PATENT OFFICE.

PAUL W. KOCH, OF CHICAGO, ILLINOIS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

MANHOLE SWITCH.

Application filed April 14, 1924. Serial No. 706,326.

This invention relates to electric switches adapted to be contained in underground compartments, or so-called manhole switches, and has for an object the provision of a manhole switch arranged to be opened and closed by an operative disposed above the surface of the ground; and having a vent passage extended to the atmosphere at or above the ground level; and opening and closing mechanism disposed in said vent passage and accessible from the surface of the ground for operation.

A further object is generally to improve the construction and operation of electric switches.

Fig. 1 is a side elevation illustrating a manhole switch embodying the invention.

Fig. 2 is an enlarged sectional view, in detail of the novel features contained in the switch of Fig. 1.

Fig. 3 is a view similar to Fig. 2, but showing a modification of the control mechanism.

As here shown, the manhole-type switch embodying the invention is adapted to be contained in a compartment 10 located below the ground or street level 11. The switch 12 may be of any suitable or desirable construction and, as here shown, is completely enclosed and is water and gas tight except as may be described hereinafter. Circuit leads may enter the switch casing through the bushings or insulators 13. The switch may be supported in any suitable manner as by the flange 14 from a beam 15. The switch is provided with a suitably-supported rotatable operating shaft 16, Fig. 2, which is connected with suitable operating mechanism, not necessarily shown, and is adapted to be rocked or partially rotated in one direction to open the circuit through the switch, and in the opposite direction to close the circuit through the switch.

Ordinarily it has been necessary to remove the manhole cover, by which to gain access to the switch compartment, and enter the compartment in order to operate the switch, thereby requiring the expenditure of considerable time and labor, and causing the operative to be in proximity with live conductors. In accordance with this invention, means are provided by which the switch may be operated readily from the switch level, thereby to eliminate the above and other detriments.

To this end the operating shaft is extended outwardly beyond the switch casing through an aperture 17 in the wall thereof. Preferably, although not necessarily said aperture is appreciably larger than said shaft whereby to provide a vent passage from the interior of the switch casing. Said shaft is adapted to extend, also, through an aperture 18 in a bracket 20, which bracket may be secured, preferably removably, to the external face of the switch casing by suitable means as the screws 21. Said aperture 18, also, may be a vent aperture and is aligned with the vent-aperture 17. A bevel gear 22 is fixed to the end of said operating shaft and is adapted to be engaged by a second bevel gear 23. Said bevel gear 23 is or may be fixed to the lower end of a vertically disposed control shaft 24, which shaft is adapted to extend upwardly toward the surface of the ground. The lower end of said shaft may be rotatably supported in the foot 20ª of said bracket 20 whereby to maintain proper meshing of the gears.

An enclosing casing or housing 30 is adapted to surround said gears and bracket, and said casing is or may be secured, preferably removably, and in a water and gas tight manner, to the switch casing, about said operating shaft 16, and apertures 17 and 18, by the bolts 31, or other suitable means. The upper end of said casing may be formed or provided with an internally screw-threaded opening 32 into which the lower end of a pipe 33 may be threaded; and said control shaft 24 is adapted to extend upwardly within said pipe.

Said pipe 33 is extended upwardly above the switch and through the ceiling of the switch-compartment and, preferably, terminates just below the ground level, where its upper end has screw-threaded thereto a surface member 34, which member is, in effect, a continuation and enlargement of said pipe. Preferably said surface member is formed with a peripherally-outstanding flange 34ª which is adapted to be inset in the surface of the ground and be substantially flush with the surface thereof. Said surface member is or may be formed or provided with a chamber 35 in which the upper end of said control shaft 24 is received. The upper end of said shaft may be suitably formed, as by being provided with the square head 36, to receive a wrench or other suitable tool by which to rotate said shaft, which tool may be introduced into said compartment 35 through the open upper end or entrance thereof.

It is apparent that the rotation of said control shaft 24 will be transferred through the bevel gears 23 and 22 to the operating shaft, whereby the switch may be controlled from the surface of the ground.

Normally the compartment 35 may be sealed against entrance of moisture or gas by the plug 38, which plug may be removably screw-threaded in the entrance of said surface member, thereby to seal the upper end of said compartment 35, and, consequently, the interior of said pipe 33, casing 30, and switch casing. When the switch is to be operated said plug may be removed and, for this purpose, may be formed with the non-circular recess 39, or equivalent means, adapted to receive a wrench or other suitable tool.

While the construction above set forth is intended to provide for a normally gas tight and non-vented switch, if it is desired to provide for a continually-operative switch vent, the plug 38 may be replaced by a plug 38ª, shown in dotted lines, Fig. 2, which plug may be formed with an external wrench-engaging portion 39ª, and a vent pipe 42, which vent pipe may be in constant communication with the chamber 35 at all times while the plug is in place in said surface member. It is apparent that there is free gaseous communication between the atmosphere and the interior of the switch casing by means of the vent passages 17 and 18, said vent pipe and the mechanism-enclosing casing comprising said member 34, pipe 33, and casing 30.

For some purposes it may be desirable to omit the control shaft 24 as a normal part of the control mechanism and resort to the construction illustrated in Fig. 3. In this figure, the bevel gear 23ª, corresponding to gear 23, is journalled directly in the bracket 20, and is provided with a tool-engaging member, as the squared hub 23ᵇ, by which the gear may be rotated. When the switch is to be operated, an operating tool having a relatively long shank 24ª, corresponding to shaft 24, is adapted to be extended downwardly in the pipe 23 through the entrance thereto, and said shank 24 may have a lower socket 24ᵇ adapted to engage the hub 23ᵇ, whereby to rotate said gear and consequently operate the switch.

The construction may be otherwise modified without departing from the spirit of the invention.

I claim:

1. The combination of an underground compartment, an electric switch contained in said compartment having an enclosing casing, an operating member extended through said casing and terminated adjacent the surface, a conduit enclosing said operating member and extended from the surface of the switch casing and having a water tight connection with said switch casing, and a removable closure for the surface-end of said conduit above the end of said operating member, said conduit and switch casing having provision for free gaseous intercommunication.

2. The combination of an underground compartment, an electric switch contained in said compartment having an enclosing casing, an operating member extended through said casing and terminated adjacent the surface, a conduit enclosing said operating member and extended from the surface to the switch casing and having a water tight connection with said switch casing, and a removable closure for the surface-end of said conduit above the end of said operating member, said closure having a vent passage therethrough which establishes gaseous communication between said conduit and the atmosphere, and said conduit and switch-casing having provision for free gaseous intercommunication.

3. The combination of an underground compartment, an electric switch contained in said compartment, said switch having an enclosing casing, a vent conduit in communication with said switch casing and extended upwardly above the switch casing and compartment and terminated approximately at the surface of the ground, and a switch operating member disposed in said vent conduit in a position to be operated from the surface of the ground.

4. A manhole-type electric switch having an enclosing casing, a mechanism-enclosing casing secured to one side of said switch casing and extended upwardly thereabove and having an entrance at its upper end, a switch-operating shaft extended from the switch casing into said mechanism-enclosing casing, a gear fixed to the extended end of said shaft, a second gear journalled in said mechanism-enclosing casing and meshed with said first gear, and means to operate said first gear through the entrance of said mechanism-enclosing casing.

5. A manhole-type electric switch having an enclosing casing, a mechanism-enclosing casing secured to said switch casing and extended upwardly thereabove and having an entrance at its upper end, a switch-operating shaft extended from the switch casing into said mechanism-enclosing casing, a gear fixed to the extended end of said shaft, a second gear journalled in said mechanism-enclosing casing and meshed with said first gear, means to operate said first gear through the entrance of said mechanism-enclosing casing, and means to vent the switch casing through said mechanism-enclosing casing.

In testimony whereof, I have signed my name to this specification.

PAUL W. KOCH.